(12) United States Patent
Dixit et al.

(10) Patent No.: US 11,361,225 B2
(45) Date of Patent: Jun. 14, 2022

(54) NEURAL NETWORK ARCHITECTURE FOR ATTENTION BASED EFFICIENT MODEL ADAPTATION

(71) Applicant: Microsoft Technology Licensing, LLC, Redmond, WA (US)

(72) Inventors: Mandar Dilip Dixit, Redond, WA (US); Gang Hua, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 815 days.

(21) Appl. No.: 16/224,361

(22) Filed: Dec. 18, 2018

(65) Prior Publication Data

US 2020/0193296 A1 Jun. 18, 2020

(51) Int. Cl.
*G06N 3/08* (2006.01)
*G06K 9/62* (2022.01)
*G06N 3/063* (2006.01)
*G06N 20/10* (2019.01)

(52) U.S. Cl.
CPC .............. *G06N 3/084* (2013.01); *G06K 9/62* (2013.01); *G06N 3/063* (2013.01); *G06N 20/10* (2019.01)

(58) Field of Classification Search
None
See application file for complete search history.

(56) References Cited

U.S. PATENT DOCUMENTS

| | | | |
|---|---|---|---|
| 2016/0196479 A1* | 7/2016 | Chertok | G06K 9/6272 382/156 |
| 2017/0221176 A1* | 8/2017 | Munteanu | G06K 9/4628 |
| 2018/0165543 A1* | 6/2018 | Mody | G06K 9/6271 |
| 2019/0384994 A1* | 12/2019 | Frossard | G06K 9/3233 |
| 2020/0073968 A1* | 3/2020 | Zhang | G06F 16/152 |

OTHER PUBLICATIONS

Xu et al., Attention-Mechanism-Containing Neural Networks for High-Resolution Remote Sensing Image Classification, Remote Sens. 2018, 10, 1602; doi: 10.3390/rs10101602; pp. 1-29 (Year: 2018).*

(Continued)

*Primary Examiner* — Alan Chen
(74) *Attorney, Agent, or Firm* — Schwegman Lundberg & Woessner, P.A.

(57) ABSTRACT

A neural network architecture for attention-based efficient model adaptation is disclosed. A method includes accessing an input vector, the input vector comprising a numeric representation of an input to a neural network. The method includes providing the input vector to the neural network comprising a plurality of ordered layers, wherein each layer in at least a subset of the plurality of ordered layers is coupled with an adaptation module, wherein the adaptation module receives a same input value as a coupled layer for the adaptation module, and wherein an output value of the adaptation module is pointwise multiplied with an output value of the coupled layer to generate a next layer input value. The method includes generating an output of the neural network based on an output of a last one of the plurality of ordered layers in the neural network.

20 Claims, 8 Drawing Sheets

(56) References Cited

OTHER PUBLICATIONS

Serra et al., Overcoming Catastrophic Forgetting with Hard Attention to the Task, Proceedings of the 35 th International Conference on Machine Learning, Stockholm, Sweden, PMLR 80, 2018; Total pp. 10 (Year: 2018).*

Harley et al., Segmentation-Aware Convolutional Networks Using Local Attention Masks, arXiv:1708.04607v1 [cs.CV] Aug. 15, 2017; Total pp. 11 (Year: 2017).*

Chollet, F., "Xception: Deep learning with depthwise separable convolutions", In Journal of the Computing Research Repository, Oct. 2016, 8 Pages.

Deng, J., et al., "Imagenet: A Large-Scale Hierarchical Image Database", In Proceedings of IEEE Conference on Computer Vision and Pattern Recognition, 2009, pp. 248-255.

Donahue, J., et al., "DeCAF: A Deep Convolutional Activation Feature for Generic Visual Recognition", In Proceedings of the 31st International Conference on Machine Learning, Jun. 21, 2014, 9 Pages.

French, R. M., "Catastrophic forgetting in connectionist networks: Causes, consequences and solutions", In Journal of Trends in Cognitive Sciences, vol. 1, Issue 3, Apr. 1999, pp. 128-135.

Girshick, R., "Fast R-CNN", In Proceedings of international Conference on Computer Vision, 2015, pp. 1440-1448.

Girshick, R., et al., "Rich feature hierarchies for accurate object detection and semantic segmentation", In Proceedings of the IEEE Conference on Computer Vision and Pattern Recognition, 2014, pp. 580-587.

Gong, Y., et al., "Multi-scale Orderless Pooling of Deep Convolutional Activation Features", In Proceedings of 13th European Conference on Computer Vision, Part VII, LNCS 8695, 2014, pp. 392-407.

Griffin, G., et al., "Caltech-256 Object Category Dataset", In Caltech Technical Report, 2006, 20 Pages.

He, K., et al., "Deep residual learning for image recognition.", In Proceedings of IEEE Conference on Computer Vision and Pattern Recognition, 2016, pp. 770-778.

He, K., et al., "Spatial Pyramid Pooling in Deep Convolutional Networks for Visual Recognition", In Proceedings of European Conference on Computer Vision, Part III, LNCS 8691, 2014, 346-361.

Ioffe, S., et al., "Batch Normalization: Accelerating Deep Network Training by Reducing Internal Covariate Shift", In Journal of the Computing Research Repository, 2015, pp. 1-11.

Xiao, J., et al., "Sun Database: Large-scale Scene Recognition from Abbey to Zoo", In Proceedings of IEEE Conference on Computer Vision and Pattern Recognition, 2010, pp. 3485-3492.

Krizhevsky, A., et al., "ImageNet classification with deep convolutional neural networks", in Proceedings of Advances in Neural Information Processing Systems 25(2), Dec. 3, 2012, pp. 1-9.

Lin, T-Y., et al., "Bilinear Convolutional Neural Networks for Fine-Grained Visual Recognition", In Proceedings of IEEE Transactions on Pattern Analysis and Machine Intelligence, vol. 40, No. 6, Jun. 2018, pp. 1309-1322.

Quattoni, A., et al., "Recognizing Indoor Scenes", In Proceedings of IEEE Conference on Computer Vision and Pattern Recognition, 2009, pp. 413-420.

Rebuffi, S.-A., et al., "Learning multiple visual domains with residual adapters", In Journal of Advances in Neural Information Processing Systems 30, 2017, pp. 1-11.

Ren, S., et al., "Faster R-CNN: Towards Real-Time Object Detection with Region Proposal Networks", In Journal of Advances in Neural Information Processing Systems 28, Jan. 2015, pp. 1-9.

Sanchez, J., et al., "Image Classification with the Fisher Vector: Theory and Practice", In International Journal of Computer Vision vol. 105, Issue 3, Dec. 2013, pp. 222-245.

Simonyan, K., et al., "Two-Stream Convolutional Networks for Action Recognition in Videos", In Journal of Advances on Neural Information Processing Systems 27, Jun. 9, 2014, pp. 1-9.

Zeiler, M. D., et al., "Visualizing and Understanding Convolutional Networks", In Proceedings of European Conference on Computer Vision, Part 1, LNCS 8689, 2014, pp. 818-833.

Zhou, B., et al., "Learning Deep Features for Discriminative Localization", In Proceedings of the IEEE Conference on Computer Vision and Pattern Recognition, 2016, pp. 2921-2929.

Zhou, B., et al., "Learning Deep Features for Scene Recognition Using Places Database", In Journal of Advances in Neural Information Processing Systems 27, Dec. 8, 2014, pp. 1-9.

* cited by examiner

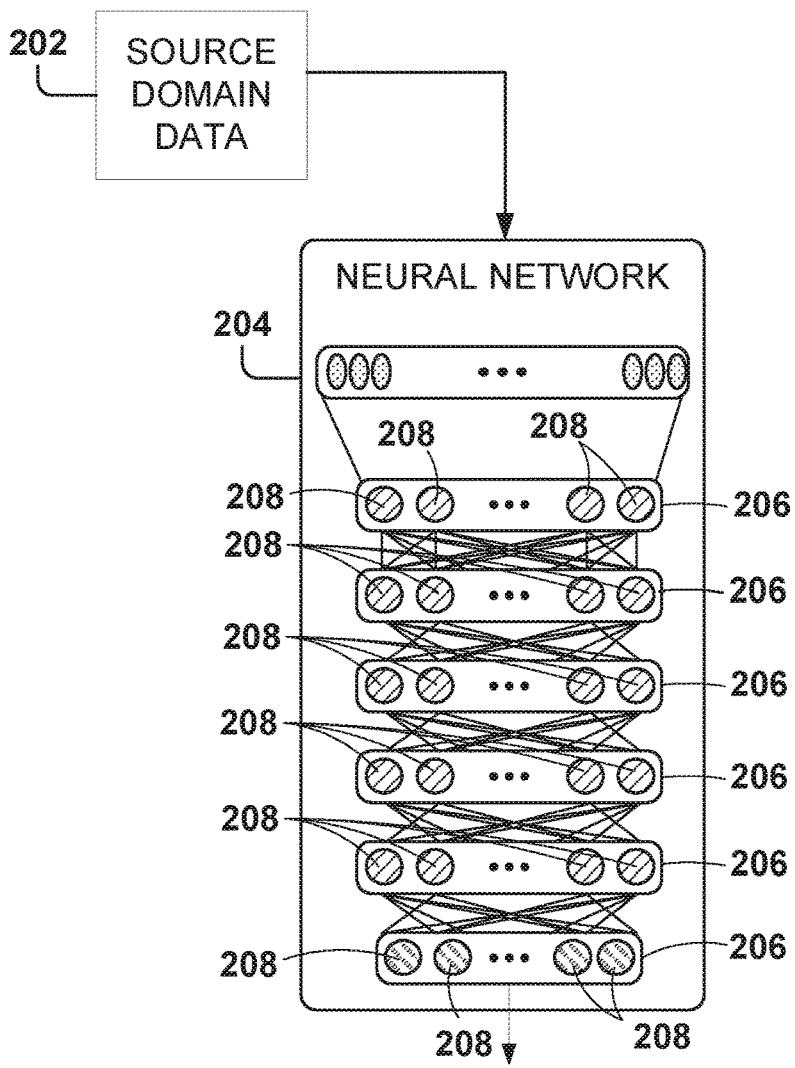
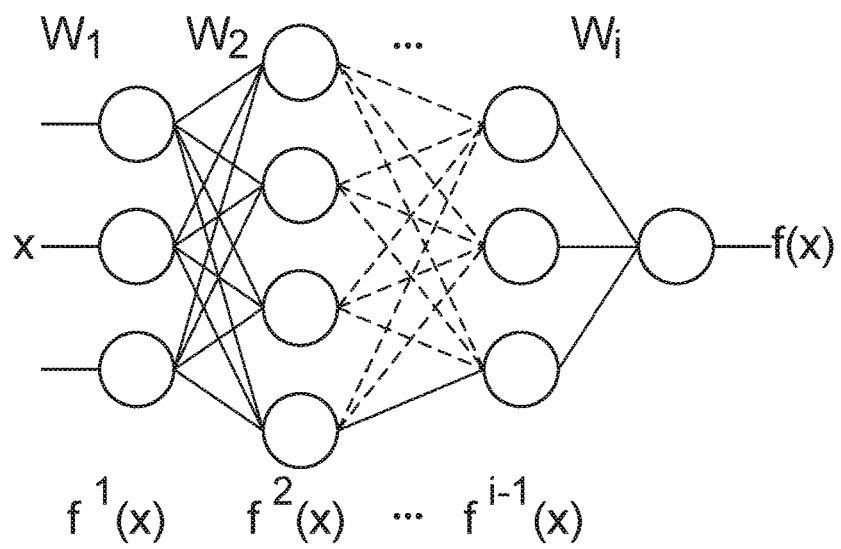
FIG. 2

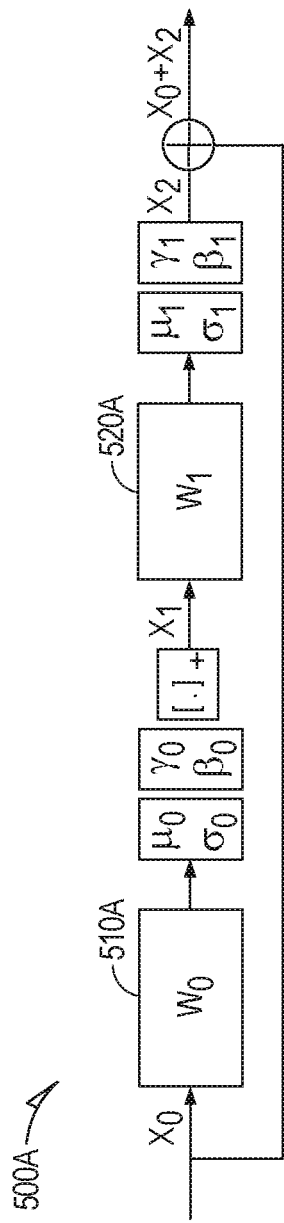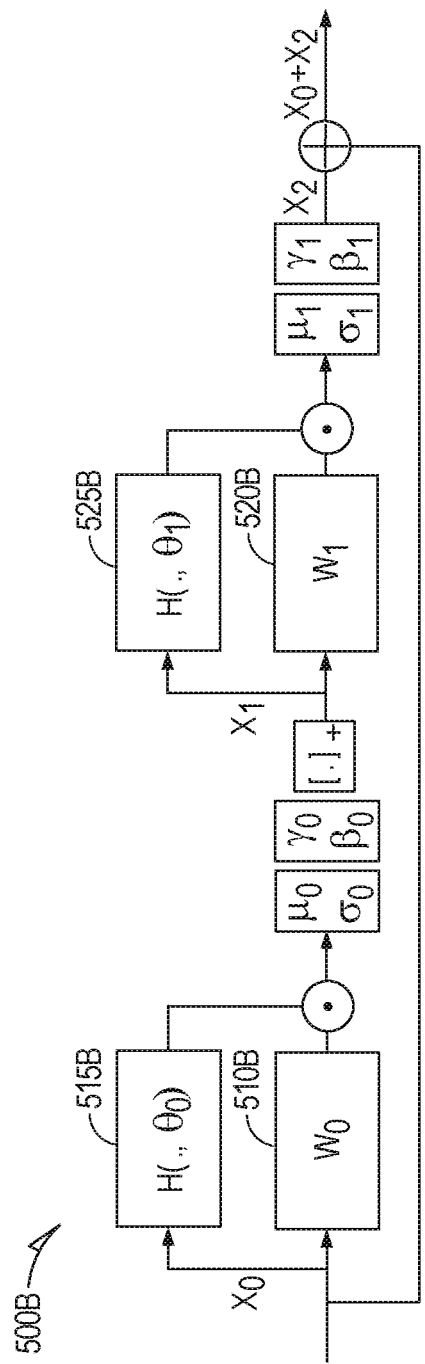

NEURAL NETWORK ARCHITECTURE FOR ATTENTION BASED EFFICIENT MODEL ADAPTATION

BACKGROUND

Large-scale neural networks exist for solving some problems, for example, image recognition. Adapting these large-scale neural networks for other (e.g., more specialized) problems may be desirable.

BRIEF DESCRIPTION OF THE DRAWINGS

Some embodiments of the technology are illustrated, by way of example and not limitation, in the figures of the accompanying drawings.

FIG. 2 illustrates an example neural network, in accordance with some embodiments.

FIG. 5A illustrates a building block of a residual neural network, in accordance with some embodiments.

FIG. 5B illustrates a building block of a residual neural network coupled with an adaptation module, in accordance with some embodiments.

SUMMARY

Figure 1:
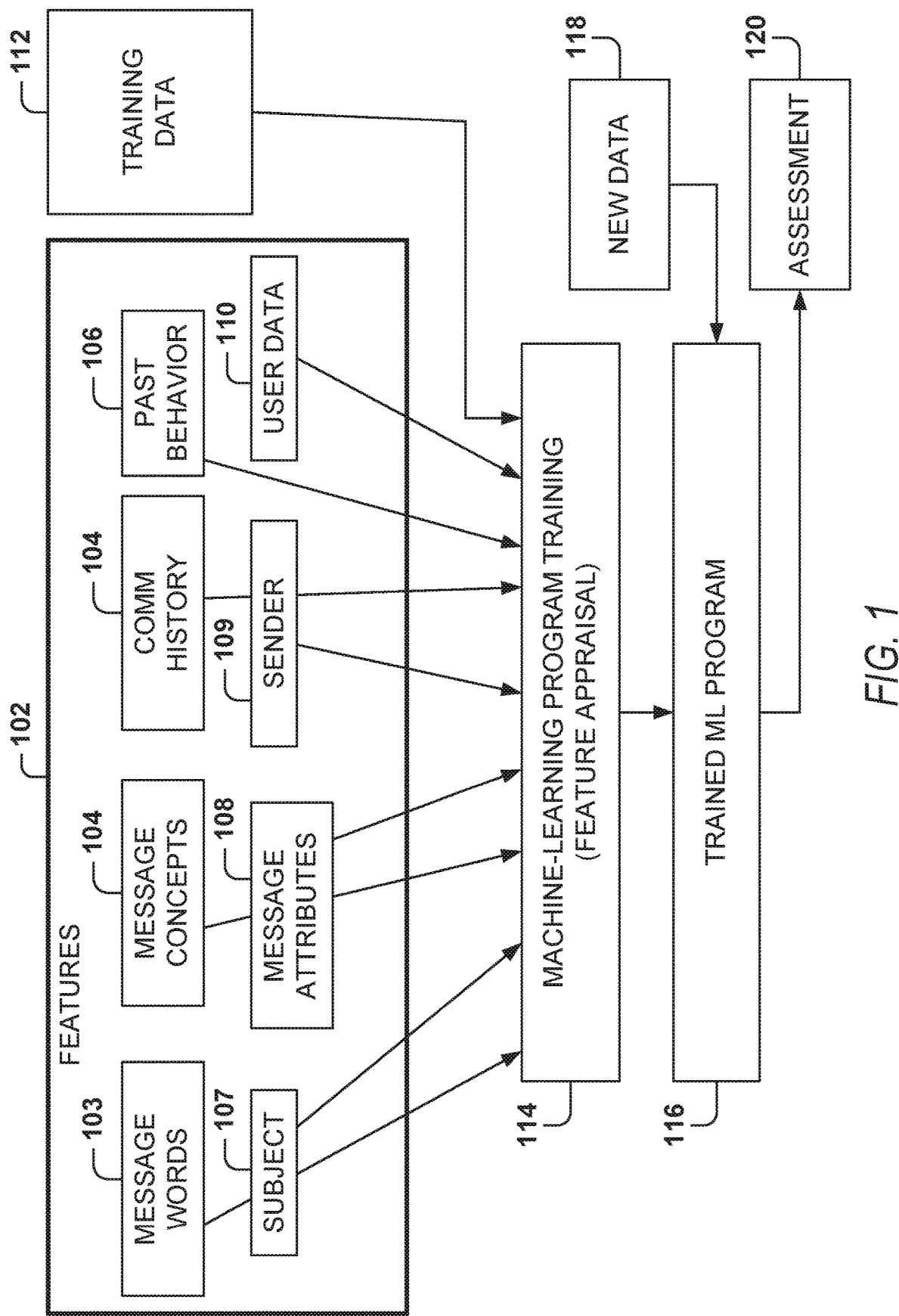
FIG. 1 illustrates the training and use of a machine-learning program, in accordance with some embodiments.

The present disclosure generally relates to machines configured to provide neural networks, including computerized variants of such special-purpose machines and improvements to such variants, and to the technologies by which such special-purpose machines become improved compared to other special-purpose machines that provide technology for neural networks. In particular, the present disclosure addresses systems and methods for visual recognition via neural network.

According to some aspects of the technology described herein, a neural network system includes processing hardware and a memory storing instructions which, when executed by the processing hardware, cause the processing hardware to perform operations. The operations include accessing an input vector, the input vector comprising a numeric representation of an input to a neural network. The operations include providing the input vector to the neural network comprising a plurality of ordered layers, wherein each layer in at least a subset of the plurality of ordered layers is coupled with an adaptation module, wherein the adaptation module receives a same input value as the coupled layer, and wherein an output value of the adaptation module is pointwise multiplied with an output value of the coupled layer to generate a next layer input value. The operations include generating an output of the neural network based on an output of a last one of the plurality of ordered layers in the neural network.

According to some aspects of the technology described herein, a machine-readable medium stores instructions which, when executed by one or more computing machines, cause the one or more computing machines to perform operations. The operations include accessing an input vector, the input vector comprising a numeric representation of an input to a neural network. The operations include providing the input vector to the neural network comprising a plurality of ordered layers, wherein each layer in at least a subset of the plurality of ordered layers is coupled with an adaptation module, wherein the adaptation module receives a same input value as the coupled layer, and wherein an output value of the adaptation module is pointwise multiplied with an output value of the coupled layer to generate a next layer input value. The operations include generating an output of the neural network based on an output of a last one of the plurality of ordered layers in the neural network.

According to some aspects of the technology described herein, a neural network method includes accessing, at one or more computing machines, an input vector, the input vector comprising a numeric representation of an input to a neural network stored at the one or more computing machines. The method includes providing the input vector to the neural network comprising a plurality of ordered layers, wherein each layer in at least a subset of the plurality of ordered layers is coupled with an adaptation module, wherein the adaptation module receives a same input value as the coupled layer, and wherein an output value of the adaptation module is pointwise multiplied with an output value of the coupled layer to generate a next layer input value. The method includes generating, at the one or more computing machines, an output of the neural network based on an output of a last one of the plurality of ordered layers in the neural network.

DETAILED DESCRIPTION

Overview

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

As set forth above, large-scale neural networks exist for solving some problems, for example, image recognition. Adapting these large-scale neural networks for other (e.g., more specialized) problems may be desirable. For example, an image recognition neural network may be adapted for problems such as pedestrian recognition, traffic control device recognition, road hazard recognition, geographic location indicator recognition, and the like. It may be desirable to adapt a preexisting large-scale neural network to a more specialized problem, rather than training a brand new neural network for the problem, because training takes time and processing resources. Also, in some cases, only a small training set for the new, more specialized problem may be available. For example, an autonomous vehicle manufacturer may desire to train its vehicles in traffic control device recognition, but may only have a limited set of images of traffic control devices.

Some aspects of the technology disclosed herein are directed to a new method to efficiently adapt off-the-shelf deep neural networks to new computer vision tasks (called target tasks). This is achieved with the help of lightweight adaptation modules that learn to modify the signals generated within such networks (hidden layer responses). During the process of across-task transfer, the adaptation modules are attached across convolutional units of the original network and trained from scratch using a supervised objective for the target task. The adapters generate attention masks to attenuate responses of the convolutional units to which they are connected. These masks effectively guide the subsequent stages of the original network towards possible regions of interest to the new problem. In some cases, none of the convolutional layers in the original network are changed during the transfer. The frugal design of the proposed adapter modules ensures that an existing deep network can be extended to solve a new kind of problem with very few additional parameters. Compared to the current state-of-the-art method known as fine-tuning, which creates a copy of an entire network for every new task, the proposal is more scalable and efficient.

Neural networks are complex models with tens of millions of parameters. To learn a neural network that performs error-free predictions, computing machine(s) may use large-scale datasets with millions of labeled examples. For example, the ImageNet dataset has millions of object images. Networks trained with large-scale data, however, capture generic data patterns very effectively. These pretrained networks, therefore, can be extended to other tasks in the same domain (visual, textual, speech etc.) with a small amount of additional data for this new task. For example, an object recognition network trained on the ImageNet dataset can be adapted with relatively few scene images for a scene recognition task. Some aspects of the technology described here are directed to achieving neural network adaptation (or model adaptation) efficiently.

ImageNet is referred to herein as an example of a data set for which a previously trained neural network may exist. However, it should be noted that any dataset can be used in place of ImageNet. The ImageNet project is a large visual database designed for use in visual object recognition software research. Over 14 million URLs (Uniform Resource Locators) of images have been hand-annotated by ImageNet to indicate what objects are pictured. In at least one million of the images, bounding boxes are also provided. ImageNet contains over 20 thousand categories. A typical category, such as "balloon" or "strawberry," contains several hundred images.

Some implementations of the technology described herein are direct to solving the technical problem of adapting a neural network that solves a first problem to solving a second problem, different from the first problem. Some implementations are directed to a neural network architecture for attention-based efficient model adaptation. This technical problem may be solved by computing machine(s). The computing machine(s) access an input vector. The input vector comprises a numeric representation of an input to a neural network. The computing machine(s) provide the input vector to the neural network comprising a plurality of ordered layers. Each layer in at least a subset of the plurality of ordered layers is coupled with an adaptation module. The adaptation module for each layer in the subset receives a same input value as the coupled layer. An output value of the adaptation module is pointwise multiplied with an output value of the coupled layer to generate a next layer input value (or an output value for the neural network, if the coupled layer is the last layer). The computing machine(s) generate an output of the neural network based on an output of a last one of the plurality of ordered layers in the neural network.

DESCRIPTION OF FIGURES

FIG. 1 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual, measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, message subject 107, other message attributes 108, sender 109, and user data 110.

The machine-learning algorithms utilize the training data 112 to find correlations among the identified features 102 that affect the outcome or assessment 120. In some example embodiments, the training data 112 includes labelled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, when a message is checked for an action item, the machine-learning program 116 utilizes the message content and message metadata to determine if there is a request for an action in the message.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labelled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is, in some cases, very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model, satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that has not been trained on. In a second example, a false positive rate or false negative rate may be used to evaluate the models after finalization. In a third example, a delineation between data clusterings is used to select a model that produces the clearest bounds for its clusters of data.

FIG. 2 illustrates an example neural network 204, in accordance with some embodiments. As shown, the neural network 204 receives, as input, source domain data 202. The input is passed through a plurality of layers 206 to arrive at an output. Each layer 206 includes multiple neurons 208. The neurons 208 receive input from neurons of a previous layer and apply weights to the values received from those neurons in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1, W_2, \ldots, W_i$ are applied to the input to each layer to arrive at $f^1(x), f^2(x), \ldots, f^{i-1}(x)$, until finally the output f(x) is computed.

In some example embodiments, the neural network 204 (e.g., deep learning, deep convolutional, or recurrent neural network) comprises a series of neurons 208, such as Long Short Term Memory (LSTM) nodes, arranged into a network. A neuron 208 is an architectural element used in data processing and artificial intelligence, particularly machine learning, which includes memory that may determine when to "remember" and when to "forget" values held in that memory based on the weights of inputs provided to the given neuron 208. Each of the neurons 208 used herein is configured to accept a predefined number of inputs from other neurons 208 in the neural network 204 to provide relational and sub-relational outputs for the content of the frames being analyzed. Individual neurons 208 may be chained together and/or organized into tree structures in various configurations of neural networks to provide interactions and relationship learning modelling for how each of the frames in an utterance is related to one another.

For example, an LSTM serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that is used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
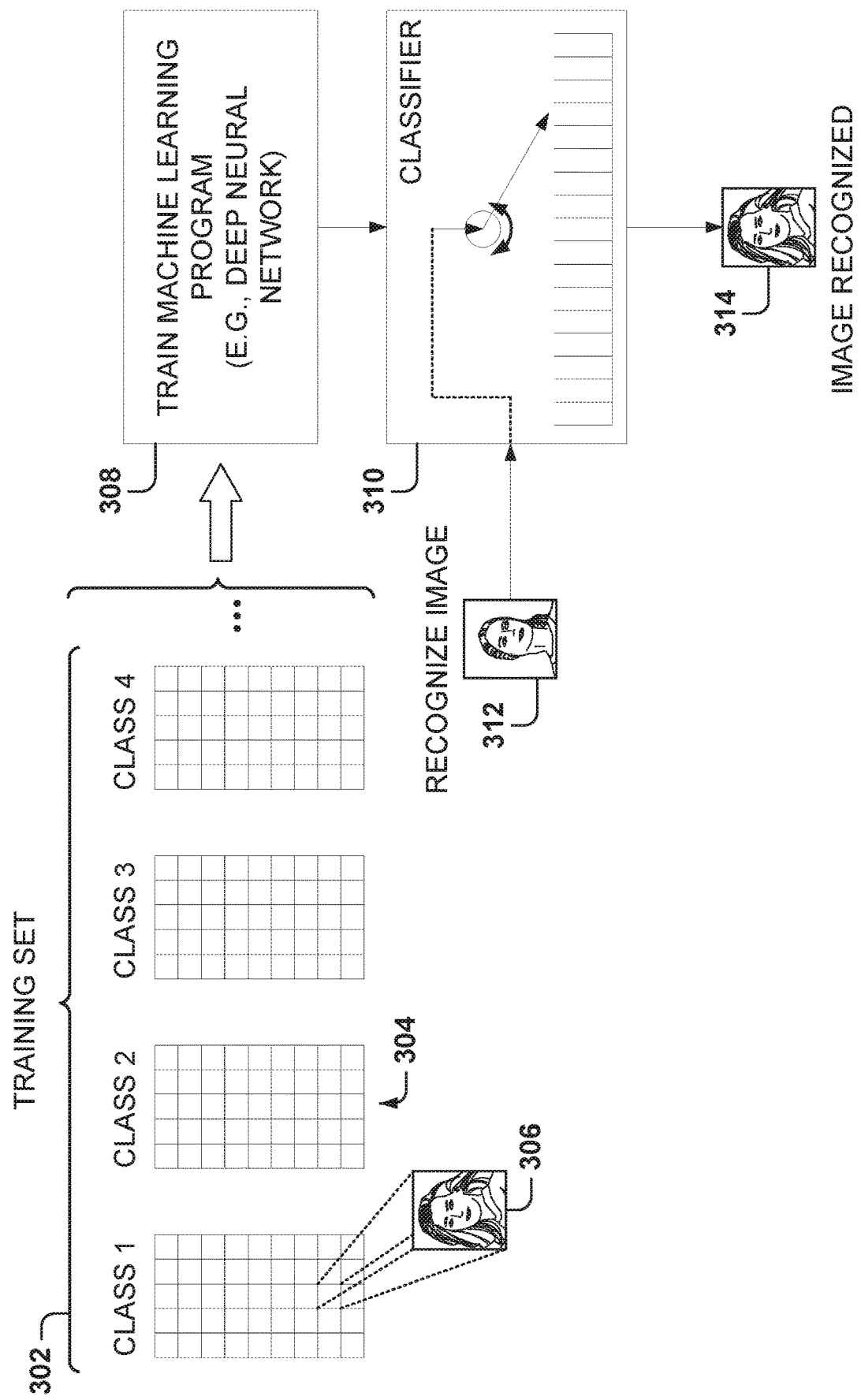
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. Training set 302 is illustrates a training set, which includes multiple classes 304. Each class 304 includes multiple images 306 associated with the class 304. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Donald Trump, one class corresponds to Barack Obama, one class corresponds to George W. Bush, etc.). At block 308 the machine learning program is trained, for example, using a deep neural network. The trained classifier at block 310, generated by the training of block 308, recognizes an image 312, which corresponds to a recognized image at block 314. For example, if the image is a photograph of Bill Clinton, the classifier recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes 304 may also be referred to as labels. Although embodiments presented herein are presented with reference to object recognition, the same principles may be applied to train machine-learning programs used for recognizing any type of items.

The training set 302 includes a plurality of images 306 for each class 304 (e.g., image 306), and each image 306 is associated with one of the categories to be recognized (e.g., a class 304). The machine learning program is trained at block 308 with the training data to generate a classifier at block 310 operable to recognize images. In some example embodiments, the machine learning program is a DNN.

When an input image 312 is to be recognized, the classifier 310 analyses the input image 312 to identify the class (e.g., at block 314) corresponding to the input image 312.

Figure 4:
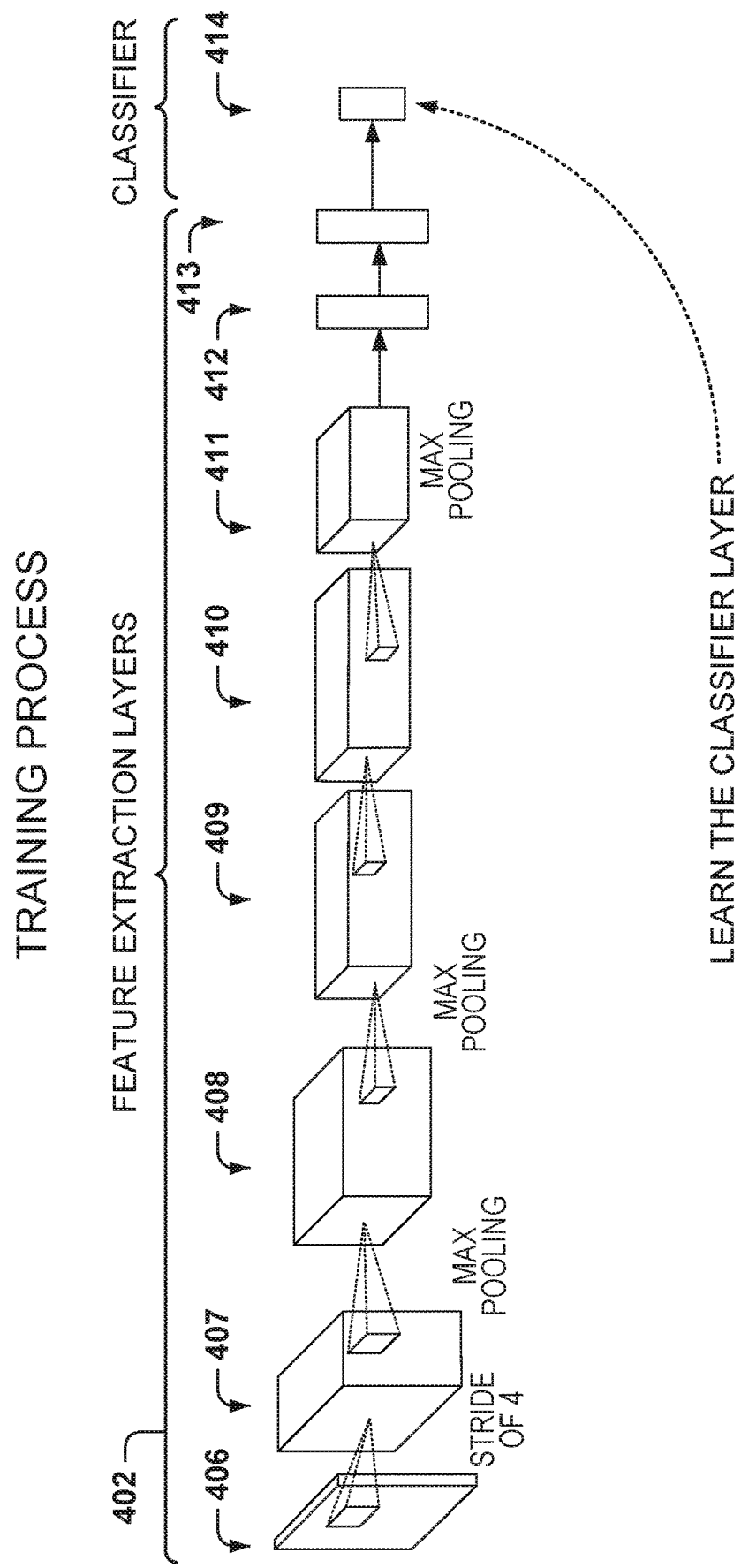
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-413 in the feature extraction layers 402.

With the development of deep convolutional neural networks, the focus in face recognition has been to learn a good face feature space, in which faces of the same person are close to each other, and faces of different persons are far away from each other. For example, the verification task with the LFW (Labeled Faces in the Wild) dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources used to describe a large set of data. When performing analysis of complex data, one of the major problems stems from the number of variables involved. Analysis with a large number of variables generally uses a large amount of memory and computational power, and it may cause a classification algorithm to over-fit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier layer 414. In FIG. 4, the data travels from left to right and the features are extracted. The goal of training the neural network is to find the parameters of all the layers that make them adequate for the desired task.

As shown in FIG. 4, a "stride of 4" filter is applied at layer 406, and max pooling is applied at layers 407-413. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set.

Some aspects of the technology described herein are directed to a new method to efficiently adapt off-the-shelf deep neural networks to new computer vision tasks. This is achieved with the help of lightweight adaptation module(s) that learn to modify the hidden responses of such networks. During the process of cross-task transfer, the modules are attached across convolutional units of the pre-trained network and trained from scratch using the supervised objective for the target task. The adapters generate attention masks to attenuate the output of the convolutional layers that they are connected to. These masks effectively guide the subsequent stages of the pre-trained network towards possible regions of interest to the new problem. None of the convolutional layers in the pre-trained network are changed during the transfer. The frugal design of the adapter modules disclosed herein ensures that an existing deep network can be extended to solve a new kind of problem with very few additional parameters. Compared to fine-tuning, which creates a copy of an entire network for every new task, the technology described herein is more scalable and efficient.

One of the most remarkable virtues of neural networks is their transferability. Very deep networks trained with large scale datasets, such as ImageNet or Places, learn to recognize generic semantic elements (e.g., "faces" and "object parts") within their hidden layers. Such strong selectivity allows neural networks trained for one task (e.g., object recognition) to be adapted easily to multiple other related tasks (e.g., scene recognition, face verification, object tracking).

One way to extend a pre-trained neural network to solve other problems is by using its activations as a generic image representation. For example, the responses of an ImageNet-trained object recognition network can be used as an image descriptor to train fine-grained recognizers, attribute detectors, and object detectors with a reasonable degree of success. An even more powerful approach is to adapt the entire pre-trained neural network to the new problem. This process, referred to as fine-tuning, uses a few controlled iterations of supervised backpropagation on a dataset labeled for the new task. Due to its simplicity and good performance on a wide range of tasks, fine-tuning is used for knowledge transfer across neural networks.

However, fine-tuning-based model adaptation may face limitations in terms of scalability. First, the technique might not provide fine-grained control over the extent to which a network is to be adapted. In most cases, all except the initial few layers of the network are updated during adaptation. These layers might account for more than 90% of the total parameters of a network. As a result, for every new task, fine-tuning adds tens of millions of parameters to the model repository. A second, perhaps related, problem is that of catastrophic forgetting. Upon fine-tuning, a neural network forgets the original task completely. Thus, an object recognition net adapted to perform face verification no longer remains generic enough to recognize other objects. The original model has to be retained separately along with its versions specialized for different problems. Due to these issues, fine-tuning might not be an efficient and scalable solution to new computer vision tasks.

A possible approach to achieving efficient adaptation is to set aside a small number of layers in a pre-trained network for task-specificity. For every new task, only these parameters are learned through adaptation while the rest of the network is kept unchanged. Lightweight layers, such as batch normalization, that are primarily regularizers could also potentially be candidates for task-specific tuning. They are, however, too limited to ensure a performance that is comparable to full fine-tuning. One scheme uses a residual module that combines a batch normalization layer and a linear layer embedded in the original network for adaptation. A more expressive adapter helps to achieve task-specific accuracy close to that of full-fine tuning at the cost of a very few extra parameters. One downside of this scheme, however, is that the original large-scale model is re-trained with the residual modules in it. A neural network pre-trained without these modules is not augmented at the time of task-specific learning. This scheme, therefore, is perhaps more suited to a multi-task learning scenario, where the whole system is trained concurrently on the original large-scale problem (e.g., an object recognition neural network trained using ImageNet) and other related problems (e.g., scene classification, object detection, etc.).

Some aspects of the technology described herein present a framework for network adaptation that is more efficient and scalable compared to fine-tuning as well as the residual adapter scheme. Some aspects learn lightweight adaptation modules that attach to the filters in a pre-trained large-scale neural network and attenuate their activations using generated attention masks. During the disclosed adaptation process, most units from the original pre-trained network are kept unchanged while the parameters within the adapter modules are learned to minimize a supervised loss for the new task. The attention masks generated by the adapters disclosed herein guide the subsequent layers of the pre-trained network towards areas of the receptive field relevant to the new problem.

Some aspects use residual networks pre-trained on ImageNet object recognition (or another large-scale neural network) as the universal model and adapt it to other tasks, such as scene classification and unseen object recognition. It is noteworthy that the attention modules are not pre-trained on ImageNet (or other large scale neural network(s)). They are merely attached to the filters of the learned model (based on ImageNet) during adaptation and trained from scratch. In some cases, such structural augmentations cannot be made using the residual adapters mainly because they are serial units and cause a large co-variate shift at the input of the subsequent layers, which hinders learning. On the other hand, if the attention modules disclosed herein are added to a neural network that is pre-trained within the ImageNet dataset and then fine-tuned to each task, they might perform relatively well.

One model adaptation architecture described herein leverages the residual convolution neural networks (ResNets). Every stage of a ResNet consists of a basic residual block, as shown in FIG. 5A.

FIG. 5A illustrates a building block 500A of a residual neural network, in accordance with some embodiments. As shown in FIG. 5A, an input $x_0$ is provided to a first layer 510A, where a weight $W_0$ is applied to the input to generate the output $x_1$. The mean ($\mu_0$), standard deviation ($\sigma_0$), gamma scaling parameter ($\gamma_0$), and beta scaling parameter ($\beta_0$) may be computed for the first layer 510A. The output of the first layer 510A, $x_1$, serves as the input to the second layer 520A, which generates the output $x_2$. The mean ($\mu_1$), median ($\sigma_1$), gamma scaling parameter ($\gamma_1$), and beta scaling parameter ($\beta_1$) may be computed for the layer 520A also. The output $x_2$ may be combined with the original input $x_0$ for further processing.

As shown, the building block 500A includes two convolution filters $W_0$ at layer 510A and $W_1$ at layer 520A, each followed by a batch normalization and a scaling layer. The input is short-circuited to the output of this block in order to impose a structural constraint that makes possible training of very deep architectures.

FIG. 5B illustrates a building block 500B of a residual neural network coupled with an adaptation module, in accordance with some embodiments. The building block 500B is similar to the building block 500A, and includes the layer 510B (which operates similarly to the layer 510A) and the layer 520B (which operates similarly to the layer 520A). However, to arrive at the value of $x_1$, the value $x_0$ is provided to the layer 510B and the adaptation module 515B coupled with that layer 510B. The results of processing $x_0$ in the layer 510B and its adaptation module 515B are pointwise multiplied (denoted by the ⊙ operation) together to yield $x_1$. Similarly, to arrive at the value of $x_2$, the value $x_1$ is provided to the layer 520B and the adaptation module 525B coupled with that layer 520B. The results of processing $x_1$ in the layer 520B and its adaptation module 525B are pointwise multiplied together to yield $x_2$.

An input map $x_0 \in \mathbb{R}^{N \times D \times D}$, where N indicates the number of channels and D indicates the dimensions, gets transformed by the residual block as shown in Equations 1-3.

$$z_0 = W_0 * x_0, \; y_0 = \frac{(z_0 - \mu_0)}{\sqrt{\sigma_0^2 + \epsilon_0}}, \; x_1 = \gamma_0 y_0 + \beta_0 \qquad (1)$$

$$z_1 = W_1 * x_1, \; y_1 = \frac{(z_1 - \mu_1)}{\sqrt{\sigma_1^2 + \epsilon_1}}, \; x_2 = \gamma_1 z_1 + \beta_1 \qquad (2)$$

$$\tilde{x} = x_0 + x_2. \qquad (3)$$

In some examples, the convolution filters in a basic block have a kernel size of 3×3 and the number of channels C∈{64, 128, 256, 512} varies depending on the depth of the block within the network. The batch normalization parameters $\mu_0, \mu_1 \in \mathbb{R}^C$ and $\sigma_0, \sigma_1 \in \mathbb{R}_+^C$ are the means and standard deviations estimated from the input mini-batch. The scaling parameters $\gamma_0, \gamma_1$ and $\beta_0, \beta_1$ serve to restore the identity of the normalized input signal. The processed output $x_2 \in \mathbb{R}^{N \times D \times D}$ of the block is then added back to the input signal $x_0$ using a short circuit connection.

Fine-tuning to adapt the ResNet entails updating $W'_i$s in each residual block according to data-driven gradients. One approach described herein is to attenuate the responses $z_i \in \mathbb{R}^{C \times D \times D}$ with attention masks $a_i \in \mathbb{R}^{C \times D \times D}$ generated by trainable parallel modules $H(., \phi_i)$, shown as the adaptation modules 515B, 525B, and described in Equations 4-6.

$$a_0 = H(x_0, \phi_0), \; \hat{z}_0 = z_0 \odot a_0 \qquad (4)$$

$$\hat{\mu}_0 = E\{\hat{z}_0\}, \; \hat{\sigma}_0^2 = \text{Var}\{\hat{z}_0\} \qquad (5)$$

$$y_0 = \frac{(\hat{z}_0 - \hat{y}_0)}{\sqrt{(\hat{\sigma}_0^2 + \epsilon_0)}}. \qquad (6)$$

In Equation 4, ⊙ denotes a pointwise multiplication between convolutional map $z_0$ and the attention map $a_0$ which produces the masked output $\hat{z}_0$. The batch norm layer parameters, as a result, change into running means and standard deviations $\{\hat{\mu}_0, \hat{\sigma}_0\}$ of the masked input $z_0$. FIG. 5B shows a schematic of a Resnet block with attention-based adaptation modules 515B, 525B attached to its convolution layers $W_i$ 510B, 520B. The effect of attenuating the responses of these filters propagates through the rest of the neural network. For example, a convolutional layer that follows the masked unit processes the input values in its receptive field as well as their relative importance as indicated by the $a_i$ values. The role of the attention modules $H(., \phi_i)$ can be seen as that of guiding the neural network (e.g., an image recognition neural network trained with ImageNet) layers to pay attention to the regions that are important to the new task. The illustration of attention-based attenuation of network activations is shown in FIG. 6.

Figure 6:
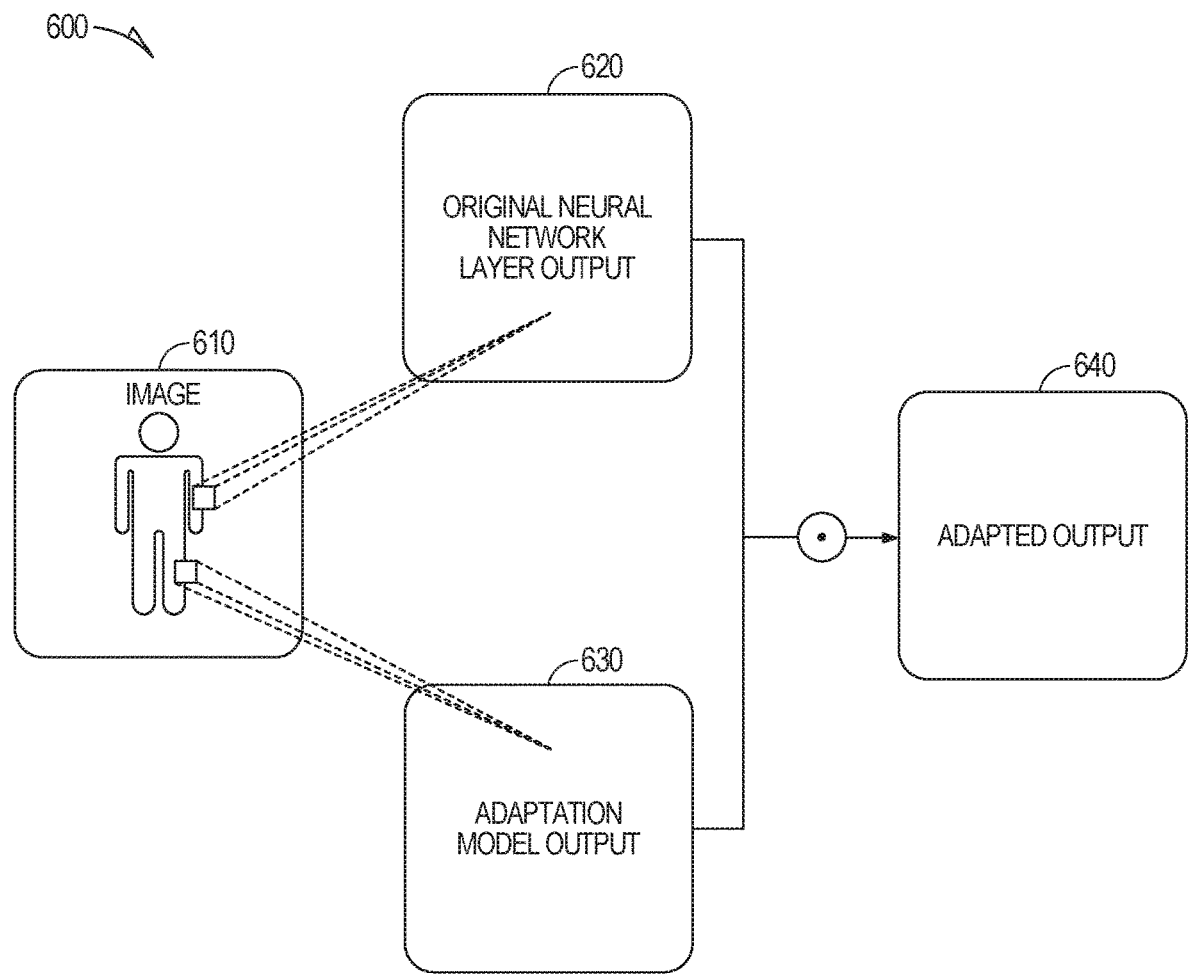
FIG. 6 illustrates an example of response attenuation, in accordance with some embodiments.

FIG. 6 illustrates an example of response attenuation 600, in accordance with some embodiments. Block 610 represents an image that corresponds to the input to a layer of a neural network (e.g., layer 510B), such as an image recognition neural network trained with ImageNet. Block 620 corresponds to the output of that layer. Block 630 corresponds to the output of an adaptation module (e.g., adaptation module 515B) coupled with that layer of the neural network. As shown in FIG. 6, block 620 and block 630 are pointwise multiplied together to yield the adapted output 640 (e.g., $x_1$) of the layer of the neural network. This adapted output 640 serves as the input to the next layer of the neural network or the output of the neural network if the layer of block 610 is the final layer.

Figures 7A, 7B:
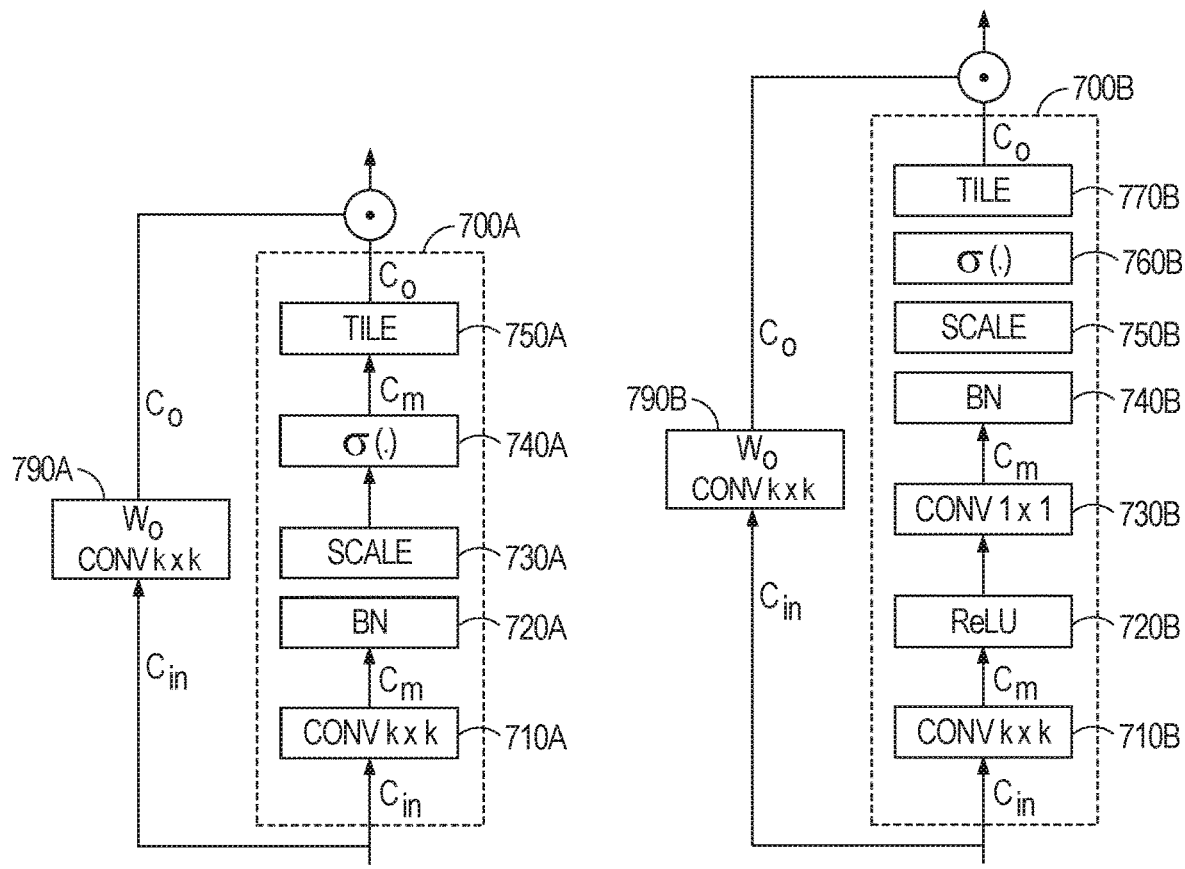
FIG. 7A illustrates a first example architecture of an adaptation module, in accordance with some embodiments.
FIG. 7B illustrates a second example architecture of an adaptation module, in accordance with some embodiments.

There are many possible ways to implement the attention modules $H(., \phi)$ that are consistent with the technology described herein. In some examples, the emphasis is on light-weight designs with sufficient flexibility to achieve good results on any new task. FIGS. 7A-7B illustrate two possible adapter prototypes which, among other prototypes, are consistent with the technology disclosed herein.

FIG. 7A illustrates a first example architecture of an adaptation module 700A, in accordance with some embodiments. FIG. 7B illustrates a second example architecture of an adaptation module 700B, in accordance with some embodiments.

A convolution $W_0$ with $C_o$ filters of spatial size k×k and input dimension $C_{in}$ denotes the ImageNet (or other dataset) trained layer 790A that is being attenuated by the adaptation module 700A. A convolution $W_0$ with $C_o$ filters of spatial size k×k and input dimension $C_{in}$ denotes the ImageNet (or other dataset) trained layer 790B that is being attenuated by the adaptation module 700B.

The adaptation module 700A samples the input to the ImageNet (or other dataset) layer $W_0$ and propagates it through another, parallel convolutional unit 710A that has $C_m$ filters each of size $C_{in}$×k×k. The output is then batch normalized (BN) 720A, scaled 730A, and sigmoid transformed 740A into $C_m$ dimensional attention maps using a sigmoid non-linearity $\sigma(.)$ The number of attention masks is maintained to be smaller than the total number of channels in the response of $W_0$, i.e., $C_m < C_o$. To match exactly the size of the activation map of $W_0$, the $C_m$ attention masks are tiled 750A. Attenuation of the output response of $W_0$ with tiled attention maps explicitly enforces multiple channels of the ImageNet (or other dataset) filter to share a common area of the receptive field. This serves as a structural regularization for the adaptation process.

The architecture of the adaptation module 700B uses two sequential convolutional stages within the adapter. The first stage 710B samples the input to $W_0$ and convolves it with $C_m$ depth-wise filters of size $C_{in}/R$×k×k. Depth-wise convolutions are performed by equally dividing the channels of the input signal into R subsets, each of which is processed by one filter. While one benefit of depth-wise convolution is faster computation, one additional result of using this strategy is to reduce the number of parameters and maintain the adapter to be lightweight. The output of the depth-wise convolution layer at the first stage 710B is subjected to a ReLU (Rectified Linear Unit) 720B non-linearity and 1×1 convolutions 730B as shown. The generated map is transformed into $C_m$ attention masks with a batch normalizing 740B, scaling 750B, and a sigmoid stage 760B similar to BN 720A, scale 730A, and sigmoid transform 740A, respectively, of the adaptation module 700A of FIG. 7A. The masks are then tiled 770B to match the size of the ImageNet (or other dataset) trained network output and then multiplied to it pointwise to obtain the desired attenuation.

Some benefits of using a sigmoid nonlinearity (e.g., at sigmoid transforms 740A, 760B) in this framework are twofold. First, a sigmoid is known for having a slow learning rate because of its gradient $\sigma(x)(1-\sigma(x))$ being very low for most values of activation x and close to zero when the activation is saturated (i.e. x=0 or 1). As a result, the adapter unit receives gentler gradients and updates its parameters slowly. The adaptation rate is, therefore, implicitly controlled. This is distinct from fine-tuning, where the only way to control the adaptation rate is to manipulate the learning rate. A second benefit is that the range of the sigmoid output is [0, 1] unlike that of a linear or a ReLU unit. A sigmoid output, therefore, might not alter the dynamic range of a feature x when multiplied to it. This may prevent large covariate shifts in the signal, which are attenuated by the adaptation modules. Furthermore, this does not slow down the learning process. Learning a randomly initialized serial unit (e.g., a convolution filter, a residual block, or a residual adapter) between layers of a pre-trained network based on ImageNet, however, might, in some cases, suffer from this problem.

As illustrated in FIGS. 7A-7B, the trained neural network layer 790A may operate simultaneously and/or in parallel with the adaptation module 700A. Similarly, the trained neural network layer 790B may operate simultaneously and/or in parallel with the adaptation module 700B.

The disclosed adaptation method generates an embedding that is reminiscent of gradient-based representations used in classical vision, namely Fisher vectors (FV). A FV uses a mixture of Gaussian codebooks to encode image features into a high dimensional descriptor. Each Gaussian code word $N(\mu_k, W_k)$ transforms a descriptor $x_0$ into Equation 7.

$$z_k \propto a_k W_k (x_0 - \mu_k), \quad (7)$$

In Equation 7, $a_k \in [0, 1]$ represents the posterior probability of $x_0$ being sampled from the $k^{th}$ code-word. In a two code-word case, $a_0$ can be expressed as a sigmoid function. The input transformation due to the disclosed adaptation modules, shown in FIG. 5B, is quite similar to an FV. In the disclosed framework, the input $x_0$ propagates though a linear layer $W_0$ and a parallel sigmoid layer $H(., \phi_0)$ to generate an output $z_0 = W_0 * x_0$ and its confidence mask $a_0$, respectively. The map $z_0$ is then scaled with the confidence $a_0$ and the result is centered using a batch norm layer. If $W_0$ is assumed to have $C_o$, 1×1 filters each element $\hat{z}_0^{i,j}$ of the masked output can be expressed as a $C_o$ dimensional FV of element $x_0^{i,j}$ under a Gaussian code-word as $\hat{\mu}_0$. In this comparison the normalization term $\sqrt{\sigma_0^2 + \in_0}$ is dropped, as it can be absorbed in the subsequent scaling layer.

$$\hat{z}_0^{i,j} \propto a_0^{i,j} W_0 * (x_0^{i,j} - \hat{\mu}_0). \quad (8)$$

An average pooling over the entire attenuated map $\hat{z}_0$ results in a pooled FV descriptor. Model adaptation is performed using the encoding in Equation 8 by training a task-specific branch $H(., \phi_0)$ that generates the attention or confidence map $a_0$.

To adapt an ImageNet (or other dataset) trained neural network, some implementations attach the proposed attention modules only across their final few layers. A predetermined number of final layers may be used, where the predetermined number is a positive integer, for example 1, 2, 3, and the like. These layers are generally known to exhibit semantic selectivity and, therefore, may be tuned with task-specific information. The initial layers of the network, on the other hand, capture generic visual primitives and can be used as a single feature extractor for all the tasks. Additionally, the attention modules are designed to be very lightweight compared to the ImageNet (or other dataset) trained convolutional units that they attach across. These modules might amount to only around 10% the size of the entire ImageNet (or other dataset) trained neural network.

One motivation behind these design choices is to enable efficient multi-task inference in environments with limited storage and memory resources (e.g., mobile devices, autonomous drones, and AR/VR (augmented reality/virtual reality) headsets). The lightweight design of the disclosed attention-based modules allows a smaller storage space for the entire multi-task classifier. If the size of a base network trained on ImageNet (or other dataset) is P, its adaptation to N new tasks using fine-tuning may increase the model size to (N+1)P. Using the disclosed method, the overall model size is only $$P\left(1 + \frac{N}{10}\right),$$

since, for every new task, only approximately $$\frac{P}{10}$$

parameters are added.

A second possible benefit of the disclosed design is the speed of inference. Since, in some aspects, the task-specific adapters are attached only to the last predetermined number of layers of the base network, the initial layers can be used as a common feature extractor stage for multiple tasks. This saves a large amount of processing time since feature extraction layers are the slowest. On the other hand, multi-task inference with fully fine-tuned networks may implement full forward propagation, sequentially, through all the task-specific networks. This makes them slower than the proposed adaptation method, despite the added computation in the attention modules used by the latter. In some schemes, the residual adapters are present in all layers, not just the last few. As a result, no part of the network can be identified as a common feature extractor for all tasks.

In some specific cases of multi-task learning, a multi-head network architecture is used in place of over full fine-tuning to each individual task. The initial layers of such a network may be task-agnostic feature extractors, whereas the final few layers are tuned to the different tasks of interest (e.g., detection, segmentation, proposal generation, counting etc.). This framework appears similar to some embodiments of the disclosed technique, but there are two main differences.

First, while a multi-head classifier results in fewer model parameters compared to fine-tuning, it is still more expensive than the proposed method. The task-specific layers (heads) in multi-head architectures might have a large number of parameters. A single residual block at the top of a residual neural network (e.g., Resnet-18), for example, has about 40% of the network's parameters. Fine-tuning it to different tasks, therefore, adds more parameters to the model than the disclosed method. Second, a multi-head architecture is feasible only for highly related tasks, such as detection and segmentation of the same stimuli. In such cases, most of the network layers can be assigned to extract common features, whereas relatively smaller heads (one or two residual stages) can be assigned to perform task-specific processing. In the disclosed technique, it is not assumed that the tasks are so closely related. The disclosed technique might yield successful adaptation of an object recognition network to holistic scene classification using the attention-based framework.

One feature of some aspects of the technology disclosed herein is that it can directly be used with any off-the-shelf neural network. The adaptation modules might, in some cases, not be trained on ImageNet (or another dataset used for the layers to which they are coupled) beforehand. Rather, they may be plugged across any layer of an existing model and learned using small-scale datasets.

Some aspects are directed to a method to perform efficient adaptation of ImageNet (or another dataset) trained neural networks to smaller vision (or other) tasks. Some aspects rely on lightweight attention modules that can be attached to units in the pre-trained network. These modules are, then, trained from scratch using a supervised objective for a desired new task. Most (or all) of the pre-trained network layers are left unchanged during the process. Within the adapted model, the attention modules guide the subsequent layers towards input regions that are related to the new task. In some cases, the disclosed adaptation method performs as well as complete fine-tuning using much fewer parameters for every new task.

Figure 8:
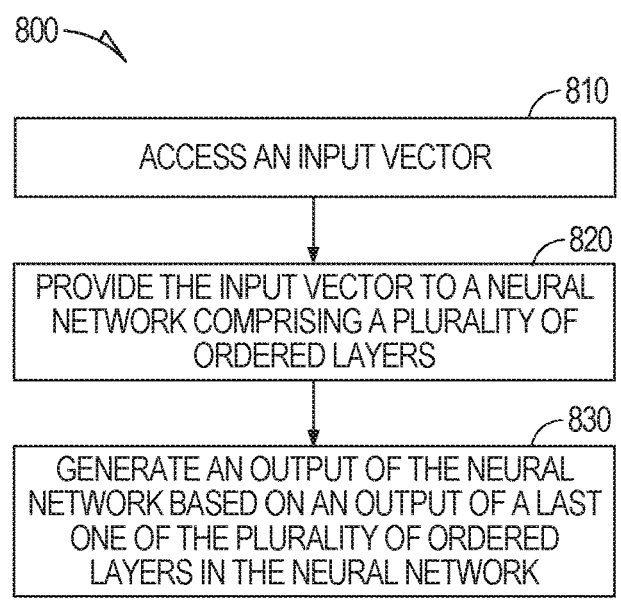
FIG. 8 illustrates a flow chart for an example method for attention-based efficient model adaptation, in accordance with some embodiments.

FIG. 8 illustrates a flow chart for an example method 800 for attention-based efficient model adaptation, in accordance with some embodiments. The method 800 may be implemented at one or more computing machine(s), such as client device(s) or server(s).

At operation 810, the computing machine(s) access an input vector. The input vector includes a numeric representation of an input to a neural network.

At operation 820, the computing machine(s) provide the input vector to a neural network comprising a plurality of ordered layers. Each layer in at least a subset of the plurality of ordered layers is coupled with an adaptation module. The adaptation module receives a same input value as the coupled layer. An output value of the adaptation module is pointwise multiplied with an output value of the coupled layer to generate a next layer input value (or an output value for the neural network if the coupled layer is the last layer of the neural network). In some examples, the at least the subset of the plurality of ordered layers comprises a last m layers of the plurality of ordered layers, where m is a positive integer. For instance, m may be 1, 2, 3, etc.

The adaptation module may be lightweight relative to the coupled layer. For example, the adaptation module may be at most a threshold percentage size (e.g., 15% or 10%) of the coupled layer. The threshold percentage size is a predefined number.

In some cases, the adaptation module is trained separately and using different training data from the plurality of ordered layers of the neural network. For instance, the plurality of ordered layers may be trained using ImageNet. The adaptation module may be trained using a dataset of images of traffic control devices. The dataset of images of traffic control devices may be relatively small, for example, including several hundred images. In some examples, the plurality of ordered layers of the neural network are trained to solve a first problem (e.g., image recognition in ImageNet). The adaptation module, coupled with the neural network, is trained to solve a second problem (e.g., traffic control device recognition) different from the first problem. In some cases, the adaptation module guides the neural network to focus on input regions (of the input to the coupled neural network layer) that are relevant to the second problem.

At operation 830, the computing machine(s) generate an output of the neural network based on an output of a last one of the plurality of ordered layers in the neural network. The generated output may be a solution to the second problem.

In some cases, the computing machine(s) include processing hardware that performs the method 800, and the instructions for performing the method 800 are stored in the memory of the computing machine(s). In some cases, the instructions for performing the method 800 are stored in a machine-readable medium.

Numbered Examples

Certain embodiments are described herein as numbered examples 1, 2, 3, etc. These numbered examples are provided as examples only and do not limit the subject technology.

Example 1 is a neural network system comprising: processing hardware; and a memory storing instructions which, when executed by the processing hardware, cause the processing hardware to perform operations comprising: accessing an input vector, the input vector comprising a numeric representation of an input to a neural network; providing the input vector to the neural network comprising a plurality of ordered layers, wherein each layer in at least a subset of the plurality of ordered layers is coupled with an adaptation module, wherein the adaptation module receives a same input value as a coupled layer for the adaptation module, and wherein an output value of the adaptation module is pointwise multiplied with an output value of the coupled layer to generate a next layer input value; and generating an output of the neural network based on an output of a last one of the plurality of ordered layers in the neural network.

In Example 2, the subject matter of Example 1 includes, wherein the adaptation module is lightweight relative to the coupled layer.

In Example 3, the subject matter of Examples 1-2 includes, wherein the adaptation module is trained separately and using different training data from the plurality of ordered layers of the neural network.

In Example 4, the subject matter of Example 3 includes, wherein the plurality of ordered layers of the neural network are trained to solve a first problem, and wherein the adaptation module, coupled with the neural network, is trained to solve a second problem different from the first problem.

In Example 5, the subject matter of Example 4 includes, wherein the adaptation module guides the neural network to focus on input regions that are relevant to the second problem.

In Example 6, the subject matter of Examples 4-5 includes, wherein the first problem is image recognition.

In Example 7, the subject matter of Examples 4-6 includes, wherein the generated output comprises a solution to the second problem.

In Example 8, the subject matter of Examples 1-7 includes, wherein the at least the subset of the plurality of ordered layers comprises a last m layers of the plurality of ordered layers, wherein m is a positive integer.

Example 9 is a non-transitory machine-readable medium storing instructions which, when executed by one or more computing machines, cause the one or more computing machines to perform operations comprising: accessing an input vector, the input vector comprising a numeric representation of an input to a neural network; providing the input vector to the neural network comprising a plurality of ordered layers, wherein each layer in at least a subset of the plurality of ordered layers is coupled with an adaptation module, wherein the adaptation module receives a same input value as a coupled layer for the adaptation module, and wherein an output value of the adaptation module is pointwise multiplied with an output value of the coupled layer to generate a next layer input value; and generating an output of the neural network based on an output of a last one of the plurality of ordered layers in the neural network.

In Example 10, the subject matter of Example 9 includes, wherein the adaptation module is lightweight relative to the coupled layer.

In Example 11, the subject matter of Examples 9-10 includes, wherein the adaptation module is trained separately and using different training data from the plurality of ordered layers of the neural network.

In Example 12, the subject matter of Example 11 includes, wherein the plurality of ordered layers of the neural network are trained to solve a first problem, and wherein the adaptation module, coupled with the neural network, is trained to solve a second problem different from the first problem.

In Example 13, the subject matter of Example 12 includes, wherein the adaptation module guides the neural network to focus on input regions that are relevant to the second problem.

In Example 14, the subject matter of Examples 12-13 includes, wherein the first problem is image recognition.

In Example 15, the subject matter of Examples 12-14 includes, wherein the generated output comprises a solution to the second problem.

In Example 16, the subject matter of Examples 9-15 includes, wherein the at least the subset of the plurality of ordered layers comprises a last m layers of the plurality of ordered layers, wherein m is a positive integer.

Example 17 is a neural network method comprising: accessing, at one or more computing machines, an input vector, the input vector comprising a numeric representation of an input to a neural network stored at the one or more computing machines; providing the input vector to the neural network comprising a plurality of ordered layers, wherein each layer in at least a subset of the plurality of ordered layers is coupled with an adaptation module, wherein the adaptation module receives a same input value as a coupled layer for the adaptation module, and wherein an output value of the adaptation module is pointwise multiplied with an output value of the coupled layer to generate a next layer input value; and generating, at the one or more computing machines, an output of the neural network based on an output of a last one of the plurality of ordered layers in the neural network.

In Example 18, the subject matter of Example 17 includes, wherein the adaptation module is lightweight relative to the coupled layer.

In Example 19, the subject matter of Examples 17-18 includes, wherein the adaptation module is trained separately and using different training data from the plurality of ordered layers of the neural network.

In Example 20, the subject matter of Example 19 includes, wherein the plurality of ordered layers of the neural network are trained to solve a first problem, and wherein the adaptation module, coupled with the neural network, is trained to solve a second problem different from the first problem.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Components and Logic

Certain embodiments are described herein as including logic or a number of components or mechanisms. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some embodiments, a hardware component may be implemented mechanically, electronically, or any suitable combination thereof. For example, a hardware component may include dedicated circuitry or logic that is permanently configured to perform certain operations. For example, a hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

Accordingly, the phrase "hardware component" should be understood to encompass a tangible record, be that an record that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components might not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

Example Machine and Software Architecture

The components, methods, applications, and so forth described in conjunction with FIGS. 1-8 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "Internet of Things," while yet another combination produces a server computer for use within a cloud computing architecture. Not all combinations of such software and hardware architectures are presented here, as those of skill in the art can readily understand how to implement the disclosed subject matter in different contexts from the disclosure contained herein.

Figure 9:
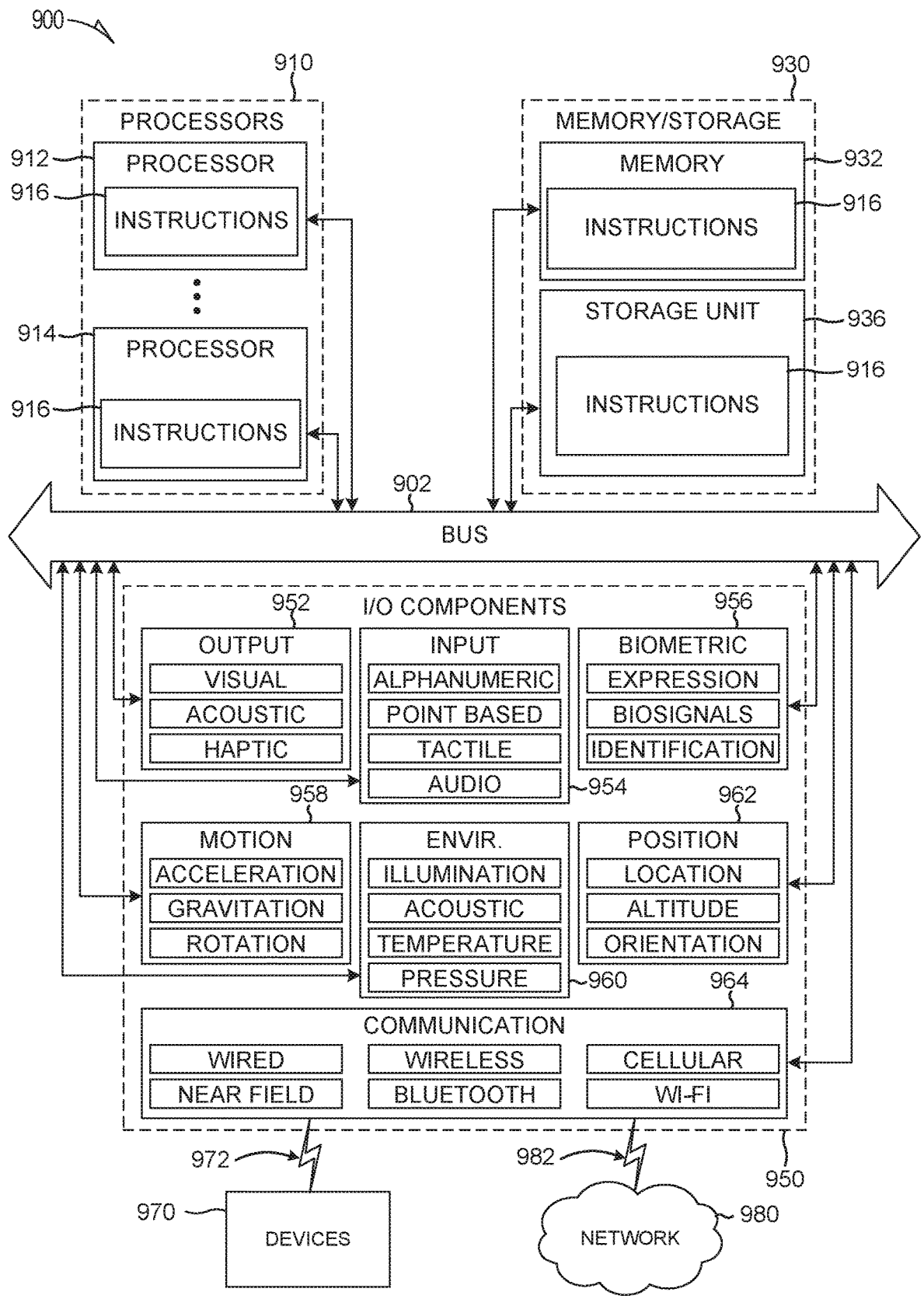
FIG. 9 is a block diagram illustrating components of a machine able to read instructions from a machine-readable medium and perform any of the methodologies discussed herein, in accordance with some embodiments.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. The instructions 916 transform the general, non-programmed machine into a particular machine programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, PC, a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory/storage 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of the processors 910 are examples of machine-readable media.

As used herein, "machine-readable medium" means a device able to store instructions (e.g., instructions 916) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine (e.g., processors 910), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), measure exercise-related metrics (e.g., distance moved, speed of movement, or time spent exercising) identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or other suitable device to interface with the network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (RFID) tag reader components, NFC smart tag detection components, optical reader components, or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

In various example embodiments, one or more portions of the network 980 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 4G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

What is claimed is:

1. A neural network system comprising:
   processing hardware; and
   a memory storing instructions which, when executed by the processing hardware, cause the processing hardware to perform operations comprising:
   accessing an input vector, the input vector comprising a numeric representation of an input to a neural network;
   providing the input vector to the neural network comprising a plurality of ordered layers, wherein each layer in at least a subset of the plurality of ordered layers is coupled with an adaptation module, wherein the adaptation module receives a same input value as a coupled layer for the adaptation module, and wherein an output value of the adaptation module is pointwise multiplied with an output value of the coupled layer to generate a next layer input value, wherein the adaptation module is trained using different training data from the ordered layers of the neural network; and generating an output of the neural network based on an output of a last one of the plurality of ordered layers in the neural network.

2. The system of claim 1, wherein the adaptation module is lightweight relative to the coupled layer.

3. The system of claim 1, wherein the adaptation module is trained separately from the plurality of ordered layers of the neural network.

4. The system of claim 3, wherein the plurality of ordered layers of the neural network are trained to solve a first problem, and wherein the adaptation module, coupled with the neural network, is trained to solve a second problem different from the first problem.

5. The system of claim 4, wherein the adaptation module guides the neural network to focus on input regions that are relevant to the second problem.

6. The system of claim 4, wherein the first problem is image recognition.

7. The system of claim 4, \herein the generated output comprises a solution to the second problem.

8. The system of claim 1, wherein the at least the subset of the plurality of ordered layers comprises a last m layers of the plurality of ordered layers, wherein m is a positive integer.

9. A non-transitory machine-readable medium storing instructions which, when executed by one or more computing machines, cause the one or more computing machines to perform operations comprising:

accessing an input vector, the input vector comprising a numeric representation of an input to a neural network;

providing the input vector to the neural network comprising a plurality of ordered layers, wherein each layer in at least a subset of the plurality of ordered layers is coupled with an adaptation module, wherein the adaptation module receives a same input value as a coupled layer for the adaptation module, and wherein an output value of the adaptation module is pointwise multiplied with an output value of the coupled layer to generate a next layer input value, wherein the adaptation module is trained using different training data from the ordered layers of the neural network; and generating an output of the neural network based on an output of a last one of the plurality of ordered layers in the neural network.

10. The machine-readable medium of claim 9, wherein the adaptation module is lightweight relative to the coupled layer.

11. The machine-readable medium of claim 9, wherein the adaptation module is trained separately from the plurality of ordered layers of the neural network.

12. The machine-readable medium of claim 11, wherein the plurality of ordered layers of the neural network are trained to solve a first problem, and wherein the adaptation module, coupled with the neural network, is trained to solve a second problem different from the first problem.

13. The machine-readable medium of claim 12, wherein the adaptation module guides the neural network to focus on input regions that are relevant to the second problem.

14. The machine-readable medium of claim 12, wherein the first problem is image recognition.

15. The machine-readable medium of claim 12, wherein the generated output comprises a solution to the second problem.

16. The machine-readable medium of claim 9, wherein the at least the subset of the plurality of ordered layers comprises a last m layers of the plurality of ordered layers, wherein m is a positive integer.

17. A neural network method comprising:

accessing, at one or more computing machines, an input vector, the input vector comprising a numeric representation of an input to a neural network stored at the one or more computing machines;

providing the input vector to the neural network comprising a plurality of ordered layers, wherein each layer in at least a subset of the plurality of ordered layers is coupled with an adaptation module, wherein the adaptation module receives a same input value as a coupled layer for the adaptation module, and wherein an output value of the adaptation module is pointwise multiplied with an output value of the coupled layer to generate a next layer input value, wherein the adaptation module is trained using different training data from the ordered layers of the neural network; and generating, at the one or more computing machines, an output of the neural network based on an output of a last one of the plurality of ordered layers in the neural network.

18. The method of claim 17, wherein the adaptation module is lightweight relative to the coupled layer.

19. The method of claim 17; wherein the adaptation module is trained separately from the plurality of ordered layers of the neural network.

20. The method of claim 19, wherein the plurality of ordered layers of the neural network are trained to solve a first problem, and wherein the adaptation module, coupled with the neural network, is trained to solve a second problem different from the first problem.

* * * * *